US007421574B2

(12) United States Patent
Zhong

(10) Patent No.: US 7,421,574 B2
(45) Date of Patent: Sep. 2, 2008

(54) METHOD FOR AUTO-EXECUTING AND BOOTING-HOST COMPUTER THROUGH SEMICONDUCTOR STORAGE DEVICE

(75) Inventor: Zhiyuan Zhong, Guangdong (CN)

(73) Assignee: Netac Technology Co., Ltd., Shenzhen (CN)

( * ) Notice: Subject to any disclaimer, the term of this patent is extended or adjusted under 35 U.S.C. 154(b) by 441 days.

(21) Appl. No.: 11/192,694

(22) Filed: Jul. 29, 2005

(65) Prior Publication Data
US 2006/0036846 A1 Feb. 16, 2006

(30) Foreign Application Priority Data
Jul. 30, 2004 (CN) .................. 2004 1 0050953

(51) Int. Cl.
*G06F 9/00* (2006.01)
*G06F 9/24* (2006.01)
(52) U.S. Cl. .................. 713/1; 713/2; 713/100
(58) Field of Classification Search .......... 713/1, 713/2, 100
See application file for complete search history.

(56) References Cited

U.S. PATENT DOCUMENTS

| 6,604,152 | B1 | 8/2003 | Bard et al. | |
|---|---|---|---|---|
| 7,222,229 | B1 * | 5/2007 | Miyamoto et al. | 713/1 |
| 2003/0163610 | A1 * | 8/2003 | Stevens | 710/8 |
| 2005/0081079 | A1 * | 4/2005 | Cheston et al. | 714/2 |
| 2005/0138408 | A1 * | 6/2005 | Vanover et al. | 713/200 |

FOREIGN PATENT DOCUMENTS

| CN | 1122281 | 9/2003 |
|---|---|---|
| CN | 1570881 | 1/2005 |
| EP | 1271332 | 1/2003 |

OTHER PUBLICATIONS

European Search Report-05016585.1-2211—mailed Feb. 18, 2008.

* cited by examiner

*Primary Examiner*—Mark Connolly
(74) *Attorney, Agent, or Firm*—Ladas & Parry LLP

(57) ABSTRACT

The present invention relates to a method of realizing automatic executing and starting host computer by using semiconductor storage device. By judging the characteristics of the operating system of the host computer, the method determines the type of the operating system of the host computer or the status of the host computer, determines the time condition of invoking the automatic executing function or starting host computer function, and triggering the invoking of relevant functions according to determined time or conditions to realize, without any assistance of users, that semiconductor storage device leads the operating system of the host computer to finish the staring host computer function and to finish the automatic executing function by triggering the automatic executing means of the host computer when the host computer has been starting up and prepares for automatic execution. The method of the present invention may be applied to a plurality of operating systems and semiconductor storage devices with multi-storage media.

8 Claims, 2 Drawing Sheets

METHOD FOR AUTO-EXECUTING AND BOOTING-HOST COMPUTER THROUGH SEMICONDUCTOR STORAGE DEVICE

TECHNICAL FIELD

The present invention is in the field of data storage, and more particularly it relates to the field of management and control by means of a semiconductor storage device.

BACKGROUND ART

At present, semiconductor storage techniques provide various additional functions for semiconductor storage devices. However, parts of the additional functions are not compatible with each other. If a semiconductor storage device may realize some of the functions, it may not be able to realize other parts of the functions. This is not easy for user to use, and hereby limits the functions of the semiconductor storage devices.

Chinese Patent No. ZL01114883.7, entitled "Multifunction Semiconductor Storage Device", discloses a method for having a semiconductor storage device to simulate a CD driver with an inserted CD to realize boosting host computer (hereinafter referred to as a method of boosting a host computer) by means of a semiconductor storage device through USB interface; and Chinese Patent Application No. 03146090.9, entitled "Method For Realizing Automatic Execution By Using Semiconductor Storage Device", discloses a method for simulating a semiconductor storage device as a CD driver having CD inserted to realize automatic opening and execution of specific program files by means of a semiconductor storage device in an operating system (hereinafter referred to as a method of automatic execution).

Both of the above mentioned methods have semiconductor storage device simulating CD driver having CD inserted. However, at present, the two methods cannot be realized in the same semiconductor storage device, that is, if a semiconductor storage device can realize the function of starting host computer, it is unable to realize the function of automatic executing, and vice versa.

The reason is because the function of automatic execution requires that semiconductor storage device reports the status of "CD medium inserted" to operating system within a period after CD driver device simulated by the semiconductor storage device has detected by the operating system to trigger the operating system to automatically execute specific program files.

The starting will fail if semiconductor storage device reports the status of "CD medium inserted" during the process of starting host computer by using the semiconductor storage device. Thus, semiconductor storage device has incomplete functions, and is inconvenience for use.

SUMMARY OF THE INVENTION

Problems to be resolved by the present invention are to correctly lead operating system of host computer by semiconductor storage device to complete the function of starting host computer, and to trigger the automatic executing means of the host computer when the host computer has been started and prepares automatic execution to complete the function of automatic execution.

In order to resolve the above technical problems, the present invention provides a method for realizing automatic executing and starting host computer by using semiconductor storage device, the semiconductor storage device is connected to host computer installed with operating system. The method includes the steps of (1) determining the characteristics of the operating system of the host computer, determining the type of the operating system of the host computer and/or the status of the host computer; (2) determining the time and/or condition invoking automatic executing function or starting host computer function; and (3) triggering the invoking of relevant functions according to the determined time and/or conditions.

In the method of the present invention, the characteristics of the operating system of the host computer in the step (1) include the characteristic of maximum number of logical device supported, and the characteristic of type and/or sequence of commands sent from host computer. The type and/or sequence of the commands sent from the host computer include if READ CAPACITY command has been sent by the host computer, if MODE SENSE (10) command has been send by the host computer, and/or the sequence of MODE SENSE (10) and READ CAPACITY commands. In the process of determining the characteristics of the operating system of the host computer, it may firstly determine the maximum number of logical device supported by the host computer, and then determine the type and/or the sequence of commands sent by the host computer; but it may also determine the type and/or the sequence of commands sent by the host computer at first, and then determine the maximum number of logical device supported by the host computer. The type of the operating system of the host computer and/or the status of the host computer include(s) the host computer not being started, the host computer being started, and/or whether having automatic executing condition. The starting host computer function of semiconductor storage device is invoked when the host computer has not been started up; and the automatic executing function of semiconductor storage device is invoked when the host computer has been started and has automatic executing condition.

In the above method, the connecting manners of the semiconductor storage device and the host computer include, but not limited to, connection via USB interface, UWB interface, Bluetooth interface, IrDA infrared interface, HomeRF interface, IEEE802.11a interface and/or IEEE802.11b interface, or connection via IEEE1394 bus, IDE bus and/or USB bus, or connection via local area network (LAN) and/or wide area network. The methods of the present invention further include the steps that the semiconductor storage device simulates two or more logical devices, and the first logical device is a type of CD driver which includes, but not limited to, CD-ROM, CD-RW, DVD-ROM, DVD-RW, DVD-RAM, blue-light DVD, and/or red-light DVD.

The method of the present invention realizes to correctly lead operating system to complete the function of starting host computer and, when the system has been started and prepares for automatic execution, the function of automatic execution in the same semiconductor storage device without assistance from user by managing and controlling the semiconductor storage device and determining the characteristics of operating system of host computer (the supported maximum number of logical device and the type of commands and/or sequence of commands sent by the host computer) to determine the type of the operating system of the host computer and the status of the host computer and further determine the time of invoking automatic executing function and starting host function. The present invention combines the traditional storage functions of the semiconductor storage device to enhance the application functions of the semiconductor storage devices and widen the application range of the semiconductor storage devices.

DETAILED DESCRIPTION OF THE INVENTION

The method having semiconductor storage device simulating CD driver having CD inserted to realize starting host computer by semiconductor storage device via USB interface has been disclosed by Chinese patent No. ZL 01114883.7, entitled "Multifunction Semiconductor Storage Device", owned by the applicant of the present invention. The method for semiconductor storage device simulating CD driver having CD inserted to realize automatical executing program files by semiconductor storage device in operating system has been disclosed by Chinese patent No. 03146090.9, entitled "Method For Realizing Automatic Execution By Using Semiconductor Storage Device". Both of them are incorporated fully herein by reference.

Figure 1:
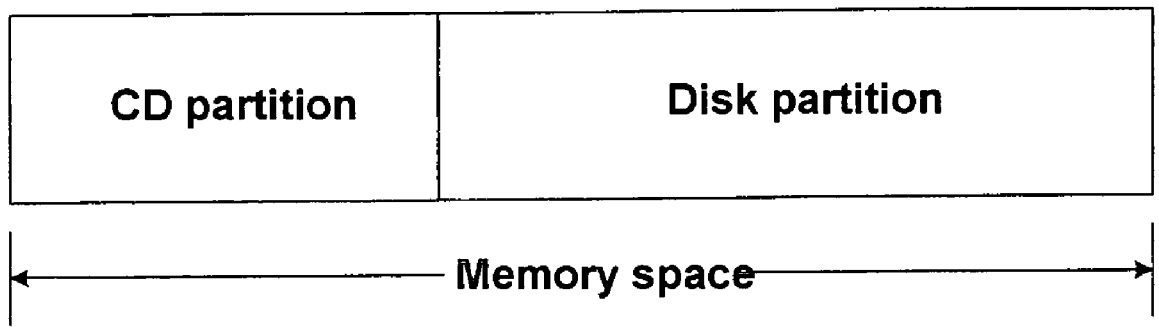
FIG. 1 is a schematic view of dividing the memory space of the semiconductor storage device according to the first embodiment of the present invention.

The first embodiment of the present invention will be described in detail with reference to FIG. 1.

In this embodiment, the memory space of the semiconductor storage device has been divided into at least two partitions in which there are at least one CD partition and one disk partition. The CD partition may be used to store startup files necessary for automatically executing configuration files and/or starting host computer, and may simulate CD driver having CD inserted. The disk partition is used for user to access data and/or automatic executing configuration files.

The semiconductor storage device in the embodiment is connected to a host computer installed with operating system. The operating system of the host computer sends inquiry command to the semiconductor storage device to acquire the type of the device being connected. For the inquiry command, the semiconductor device reports that it himself has two or more logical devices, and the type of the first logical device (LUNO) is CD driver for CD partition simulating a CD driver.

Then, it is necessary to conduct a series of detection against statuses and characteristics of the host computer, operating system and semiconductor storage device to determine the type of the operating system of the host computer and the status of the host computer and decide whether to invoke the starting host computer function or the automatic executing function of the semiconductor storage device.

In accordance with the current operating system technology, it may determine the type of the operating system of the host computer and the status of the host computer based on two characteristics of the operating system. The first characteristic is the maximum number of logical device supported by the operating system, hereafter referred to as LUN (Logic Unit Number). The maximum number of logical device means that there may be a plurality of parameters of the logical device in one and the same physical device. For example, a keyboard with mouse may have two logical devices, one is a keyboard and another is a mouse. For the host computer, they are two devices, but they are only one device physically and need only one interface for communicating with the host computer. In the same way, the present invention may divide the semiconductor storage device into two or more logical devices, wherein at least one logical device is a CD driver which is deemed as more than two devices by the host computer, but is only one device physically.

During the process of starting the host computer, a basic input output system, hereafter referred as BIOS (Basic Input Output System), of the host computer conducts boot process. It only needs several necessary commands to complete the boot process. The program space of BIOS is very small, so the host computer does not provide two logical devices for supporting when it detects the devices. Thus, it may use the commands sent by the operating system of the host computer to determine if the operating system of the host compute supports physical device with two or more logical devices. It has the steps as below: when the semiconductor storage device simulates two or more logical devices, wherein the first logical device is CD driver, it may consider that the operating system supports the physical device having two or more logical devices if, within a period (generally about more than ten seconds), one of commands from the operating system is for second logical device or other logical devices, and it may also consider that the operating system doest not support the physical device having two or more logical devices if no one of commands from the operating system is for second logical device or other logical devices.

If the operating system does not support two LUN devices, the host computer may not be started, or it may be started but only supports single logical device, for example, the operation system of WINDOWS 2000, LINUX, MAC, etc. without SP3 patch. It is necessary to further determine the status of these host computers, which needs to analyze the second characteristic.

The second characteristic is a sequence of commands from the host computer. The status of the host computer may be acquired by determining the sequence of the commands from the operating system of the host computer. In the example of WINDOWS operating system, the determining method has the steps as below: when the semiconductor storage device simulates two or more logical devices, wherein the first logical device is CD driver, it means that the host computer has finished starting process and it is not necessary for the semiconductor storage device to start the host computer if the first device does not receive MODE SENSE (10) command before receiving READ CAPACITY command from the host computer; on the other hand, it means that the host computer has not finished starting process and it is not necessary to invoke the starting host computer function of the semiconductor storage device if the first device does not receive READ CAPACITY command before receiving MODE SENSE (10) command from the host computer.

The above mentioned MODE SENSE (10) and READ CAPACITY are all standard SCSI commands, and are used, respectively, to acquire certain necessary information when accessing the devices. READ CAPACITY is a command for reading capacity of the devices, and MODE SENSE is information for determining if devices have write protection, etc. It may not send out both of them, and it may send one of them. For example, in the operating system of WINDOWS 98, it may not send out READ CAPACITY command, but only sends out MODE SENSE (10) command.

The method of the present invention does not focus on the detail of these two commands, but only concerns whether they are sent out and the sequence of sending out. For the other types of the operating system besides of WINDOWS, the status of the host computer may be determined according to the sequence of the above two commands so long as to follow SCSI standard.

Figure 2:
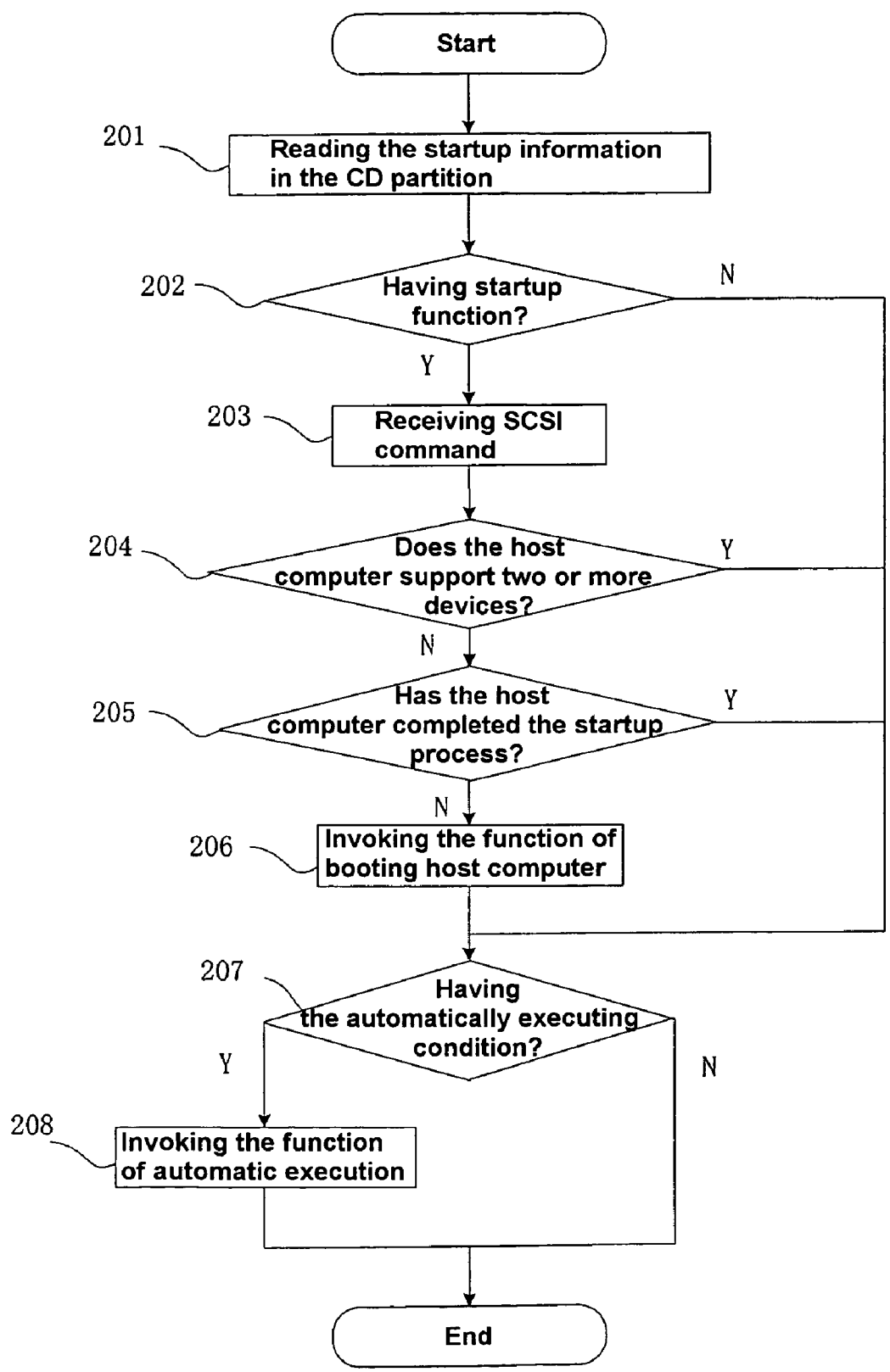
FIG. 2 is a flow chart showing the operation of realizing automatic executing and starting host computer according to the first embodiment of the present invention.

The flow of the embodiment may be obtained from the above principles and will be described in detail with reference to FIG. 2.

Step 201, the operating system of the host computer searches and reads startup information in the CD partition of the semiconductor storage device, determines if the startup information in the semiconductor storage device meets the condition of starting the host computer, and determines if the semiconductor storage device has the starting host computer function (step 202). In particularly, according to the current CD data management technology, the 34$^{th}$ page (2048 byte of each page) in each CD data is startup partition of the CD. The CD is the one with starting host computer function if there is startup identifier in the startup partition, and, otherwise, the CD is the one without starting host computer function. The host computer may determine whether the partition is provided with starting host computer function after detecting the information of the CD partition of the semiconductor storage device.

It will perform step 207 if the semiconductor storage device does not have starting host computer function to determine whether the host computer and/or the semiconductor storage device have automatic executing function. If the semiconductor storage device has starting host computer function, it will perform step 203 to receive the SCSI command sent from the host computer.

Next, it performs step 204 to determine the first characteristic of the host computer, i.e., the maximum number of logical devices supported by the operating system, according to the received SCSI command. If the host computer supports two or more devices, it means that the host computer has finished startup process and performs step 207 to determine whether the host computer and/or the semiconductor storage device are provided with automatic executing function; If the host computer does not support two or more devices, according to the above principles, it is necessary to detect the second characteristic, i.e., the sequence of the commands sent out by the host computer.

It performs step 205 to determine sequence of commands sent out by the host computer, and, according to the sequence of the commands, further analyze and determine if such kind of host computer that does not support two or more devices has finished startup process and only supports single device, or has not finished startup yet.

If the host computer has finished startup process, it will perform step 207 to determine if the host and/or semiconductor storage device have automatic executing condition; and if the host computer has not finished startup process, it will perform step 206 to invoke starting host computer function of the semiconductor storage device to boot and start the operating system of the host computer.

After finishing the above startup process of the host computer, it goes into step 207 to judge if the host computer and/or the semiconductor storage device have automatic executing condition. According to the disclosure of Chinese patent application No. 03146090.9, entitled "Method For Realizing Automatic Execution By Using Semiconductor Storage Device", it determines whether having automatic executing condition by checking the type of the operating system of the host computer and automatic executing configuration files in the semiconductor storage device. If it has automatic executing condition, in step 208, it will invoke automatic executing function to perform automatic executing process, and after that to finish the whole flow; and if it dos not have automatic executing condition, it finishes the whole flow directly.

In the above embodiment, it will take about 10 seconds to judge the first characteristic and only one to two seconds to judge the second characteristic. In order to increase the efficiency of the present invention, it may exchange the steps of judging the first characteristic and the second characteristic with each other, that is, to judge the sequence of the commands sent out by the host computer firstly and then judge the maximum number of logical devices supported by the host computer.

Only when the host computer does not support two or more logical devices, and does not receive READ CAPACITY command before receiving MODE SENSE (10) command, both of the two conditions are met, it may determine that the current host computer has not completed the startup process, and cannot invoke the automatic executing function but may invoke the starting host computer function to complete the operation of starting the host computer. Otherwise, it may deem that the host computer has completed the startup process in other conditions and should invoke the automatic executing function.

In view of the above, the principles of the present invention are to determine the type of the operating system of the host computer and the status of the host computer and further determine the time of invoking the automatic executing function and starting host computer function by managing and controlling semiconductor storage device and judging the characteristics of the operating system of the host computer (the maximum number of supported logical devices and sequence of commands sent out by the host computer) so as to realize the file automatic executing function and starting host computer function in one and the same semiconductor storage device. With the combination of traditional storage function of the semiconductor storage device, the present invention enhances the application functions of semiconductor storage devices and widens the application ranges of semiconductor storage devices. The method of the present invention may be applied to various operating systems, interfaces, and semiconductor storage devices with storage media.

Any changes and modifications to the present invention will fall within the spirit and scope of the invention defined by the following claims.

I claim:

1. A method for realizing automatic executing and starting host computer by using semiconductor storage device, and the said semiconductor storage device is connected to the host computer installed with operating system, said method comprising the steps of:
  (1) judging characteristics of the operating system of the host computer, and determining the type of the operating system of the host computer and/or the status of the host computer;
  (2) determining the time and/or conditions of invoking the automatic executing function and starting host computer function; and
  (3) triggering the invoking of relevant functions according to said determined time and/or conditions,
  wherein the characteristics of the operating system of the host computer in the step (1) including the characteristic of a maximum number of supported logical devices, and a characteristic of types and/or sequences commanded from the host computer.

2. The method for realizing automatic executing and starting host computer by using semiconductor storage device of claim 1, wherein the types and/or sequences of the commands from the host computer including sending out a READ CAPACITY command, sending out a MODE SENSE (10) command and/or the sequence of a MODE SENSE (10) and READ CAPACITY commands sent from the host computer.

3. The method for realizing automatic executing and starting host computer by using semiconductor storage device of claim 1, wherein said method firstly determines the maximum number of logical devices supported by the host computer, then determines the type and/or the sequence of the commands sent out by the host computer; and said method can also firstly determine the type and/or the sequence of the commands sent out by the host computer and then determine the maximum number of logical devices supported by the host computer.

4. The method for realizing automatic executing and starting host computer by using semiconductor storage device of claim 1, wherein said types of the operating system of the host computer and/or the status of the host computer in the step (1) include the host computer that has not been started up, the host computer that has been started up and/or if having the automatic executing conditions.

5. The method for realizing automatic executing and starting host computer by using semiconductor storage device according to the claim 1, wherein the step (1) comprises: invoking the starting host computer function of said semiconductor storage device if the host computer has not been started; and invoking the automatic executing function of said semiconductor storage device if the host computer has been started and has the automatic executing conditions.

6. The method for realizing automatic executing and starting host computer by using semiconductor storage device of claim 1, wherein connecting manners of the semiconductor storage device and the host computer include connection via USB interface, UWB interface, Bluetooth interface, IrDA infrared interface, HomeRF interface, IEEE802.11a interface and/or IEEE802.11b interface, or connection via IEEE1394 bus, IDE bus and/or USB bus, or connection via local area network (LAN) and/or wide area network.

7. The method for realizing automatic executing and starting host computer by using semiconductor storage device of claim 1, further comprising the step that said semiconductor storage device simulates two or more logical devices, and wherein a first logical device is a type of CD driver.

8. The method for realizing automatic executing and starting host computer by using semiconductor storage device of claim 7, wherein said type of CD driver includes CD-ROM, CD-RW, DVD-ROM, DVD-RW, DVD-RAM, blue-light DVD, and/or red-light DVD.

* * * * *